United States Patent [19]

Cephus

[11] Patent Number: 5,132,968
[45] Date of Patent: Jul. 21, 1992

[54] ENVIRONMENTAL SENSOR DATA ACQUISITION SYSTEM

[75] Inventor: Johnny L. Cephus, Justin, Tex.

[73] Assignee: Robotic Guard Systems, Inc., Denton, Tex.

[21] Appl. No.: 641,127

[22] Filed: Jan. 14, 1991

[51] Int. Cl.$^5$ .............................. H04J 3/24
[52] U.S. Cl. ................... 370/94.1; 340/539
[58] Field of Search ............ 340/539, 825.06, 870.28, 340/825.17; 370/94.1, 112; 379/110

[56] References Cited

U.S. PATENT DOCUMENTS

| | | | |
|---|---|---|---|
| 4,754,268 | 6/1988 | Mori | 340/710 |
| 4,808,916 | 2/1989 | Smith-Vaniz | 340/870.39 |
| 5,016,005 | 5/1991 | Shaw | 340/870.01 |
| 5,025,486 | 6/1991 | Klughart | 370/95.2 |

Primary Examiner—Douglas W. Olms
Assistant Examiner—T. Samuel

[57] ABSTRACT

A system for controlling one or more groups of remotely located sensors, such as those capable of sensing environmental hazards, and reporting the findings of each group of sensors through a microcontroller back to a host computer for recording and warnings. The host computer polls each microcontroller over a radio link. Upon being polled, a microcontroller generates a return message identifying itself and providing the desired information from those sensors connected to it. The microcontrollers essentially identical, being designed to interface with many commercially available and/or special sensors. Normally, a sensor is connected to a microcontroller by an electrical or fiber optic line. The microcontroller can turn power to certain sensors on and off to conserve battery power and sound local alarms when requested to do so by the host.

20 Claims, 3 Drawing Sheets

ENVIRONMENTAL SENSOR DATA ACQUISITION SYSTEM

TECHNICAL FIELD

My invention relates to systems which gather the data from sensors at different geographic locations to field units which then communicate the sensor data by radio to a host computer. The radio communication is two way so that the computer can ask for data at different times without requiring physical access to the field units which may be in hazardous environmental conditions.

BACKGROUND

Sensors are commercially available which can produce environmental information in the form of an electrical or optical signal about the local area in which the sensor is situated. These sensors can detect just about any hazard that can be imagined. Such sensors come in many different forms, requiring different levels of electrical power and producing outputs in many different forms. In the past, such sensors have been connected directly to alarms or other readout devices to warn surrounding personnel. In some instances, the sensors have been wired to a remote location for display and analysis. Depending on the sensor output level and the distance to the remote location, amplifiers or other means are required. Unfortunately, in many cases, the wires or fiber optic cables (collectively referred to as "land lines" herein) are expensive or impractical to install, and are subject to damage and disruption at the very time during an incident when the environmental information is needed.

There are many times and locations, especially when the handling of hazardous materials are involved, where the monitoring of environmental conditions over a wide area is desirable. Sometimes the areas are so wide or noncontagious as to prohibit the economic use of land lines to connect sensors to a central location. Examples include: refineries which may cover wide areas; battlefields where the land lines are prone to damage or sabotage; dock areas which have long linear lengths separated by water; portable hazards, such as a string of moving railroad cars with hazardous cargo or a fleet of hazardous cargo carrying trucks; and large ships where long and complex electrical or fiber optic line runs can be difficult, expensive, inconvenient to install on existing ships, and subject to damage just as the environmental information is needed.

Therefore, there has been a need, especially when dealing with toxic, explosive, or legally controlled materials or substances to have a system which can enable the gathering of information from many sensors, which may be fixed or portable, over a wide area for transmittal to a central location where the information can be processed, stored and used to provide adequate warning and/or a record of extraordinary events.

DISCLOSURE OF INVENTION

The present invention is a data acquisition system which can acquire data from many different sensor sources, on command, configure and condition the data from similar or dissimilar sensor sources into a format suitable for transmission by radio link to at a remote, presumably safe and secure, location for processing.

Generally, a host computer located at the remote location uses a radio link to request data at specific times from outlying field units. These field units include microcontrollers which are programmable to recognize a specific code transmitted by the remote host. Therefore, all field units may receive the host transmission but only the one specified by the code answers to transmit data back to the host. The request and reply sequence has a critical timing factor which must take into account the speed at which radio waves travel versus transmitter attack and receiver recovery times.

Since some types of sensors require relatively high power levels when operating, the host can be programmed and the field units configured to control the power to such sensors so that light weight battery power packs can be used for emergencies or portable use. Other sensors have components that are consumed in a relatively short time so it is desirable that the sensors be turned on only when information is being requested to conserve the consumable components. The polling order and types of sensors actually attached to any particular microcontroller are programmed into the host computer when a field unit is configured so that the returning data can be interpreted.

The host computer stores the information in the data received from the field units and can be programmed to analyze it in various ways. For example, a calculation can be made within the host computer to assure that the level of toxic contaminants in a particular area never has the opportunity to reach harmful concentrations and if need be provide a suitable safety factor in the calculations. By knowing the types of sensors, their inherent inaccuracies and the data they are producing, an algorithm can be produced which can assure that toxic levels are not reached prior to the time that an alarm is annunciated. The host computer can also be programmed to react to a dangerous trend of the data to provide a much longer warning period than systems which only look for a fixed toxic level. In some instances different toxins, in the same area can have a accumulative effect that is, harmful levels of the combined toxins are less than either toxin or other multiple toxins alone. The host computer can be programmed to assure that suitable warnings are provided prior to the time such unhealthful levels are reached.

In most instances, a warning is provided at the host computer either by an oral or visual enunciation. The host computer can also communicate with field units to control oral and visual alarms in the area being sensed.

Since a complete record of all of the sensor findings can be maintained in the host computer, the present system is useful in diagnosis of catastrophic or, for that matter, non-catastrophic events where with previous systems the information that would have been provided was that a toxic level or dangerous level or undesirable level had been reached but not how that level had accumulated. An example might be a small leak of a hydrogen sulfide gas from the waste holding tank of a large ship which, because of the geometry of the closed spaces within the ship, reaches a level of concern at some location remote from the waste holding tank. Since there may be other sources of hydrogen sulfide on board ship it is important to be able to trace the flow of contaminants prior to alarm so that in addition to providing warning the system provides clues as to root causes and thereby can be used to suggest improved maintenance procedures.

Therefore, it is an object of the present invention to provide a versatile system for providing environmental data from a large number of diverse sensors at a remote location to a central location for processing.

Another object is to integrate a sensor array into a computer controlled radio net.

Another object is to provide a system to sense for environmental hazards over a wide geographic area.

Another object is to provide a multiple sensor system which is relatively economical to manufacture, it being capable of construction with commercially available sensors, communications equipment, and computers.

These and other objects and advantages of the present invention will become apparent to those skilled in the art after considering the following detailed Specification together with the accompanying drawings wherein:

BEST MODE FOR CARRYING OUT THE INVENTION

Figure 1:
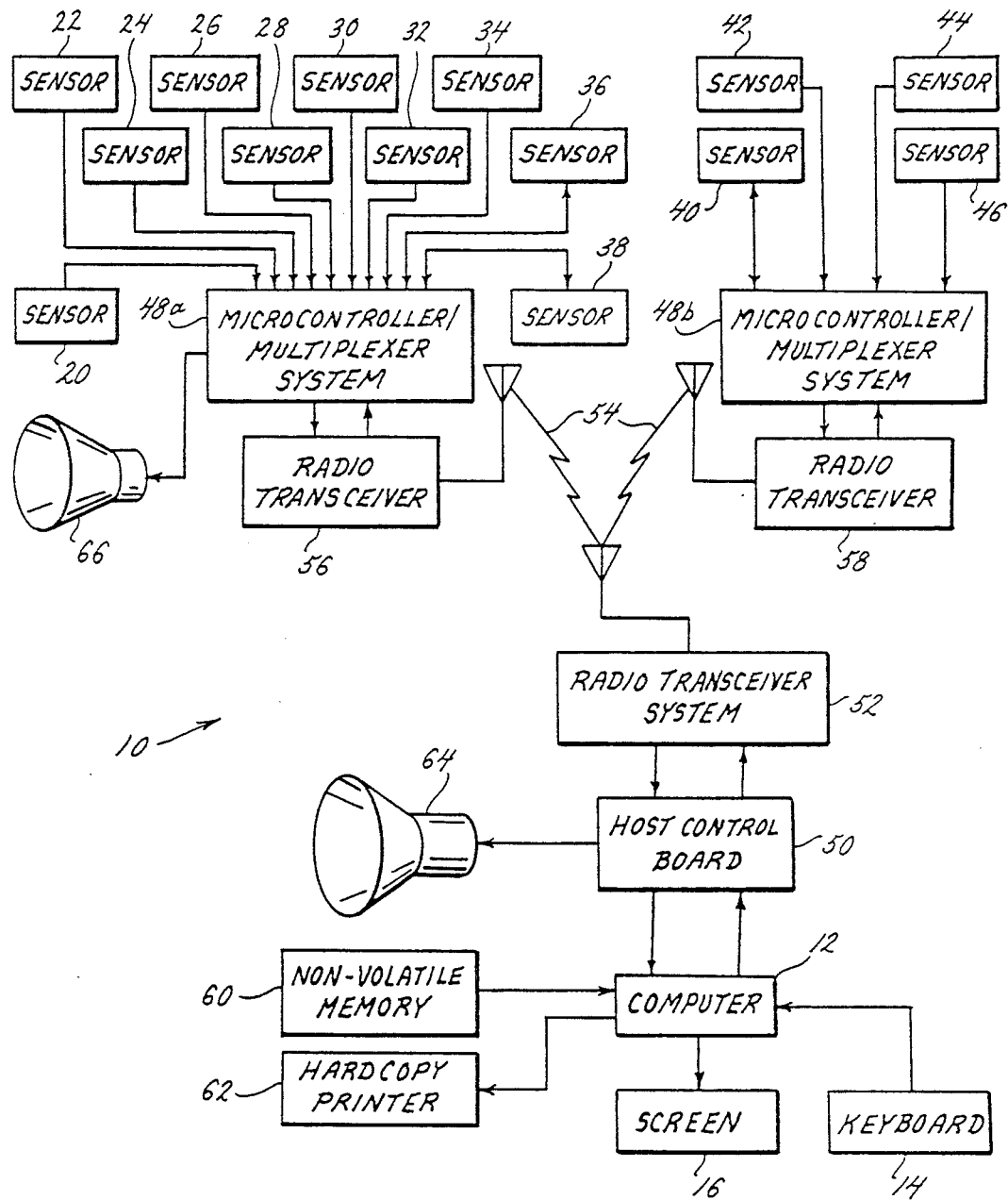
FIG. 1 is a diagram of a typical multi-sensor computer polled environmental hazard warning system constructed according to the present invention.

Referring to the drawings more particularly by reference numbers, number 10 in FIG. 1 refers to a data acquisition system for determining the atmospheric contaminants at various locations about a large industrial complex, such as an oil refinery.

The system 10 includes a host computer 12 which is programmed via a keyboard 14 and a visual screen 16 to understand the configuration and sensor type of a group of sensors 20, 22, 24, 26, 28, 30, 32, 34, 36, 38, 40, 42, 44, and 46. It is important that the host computer 12 can be easily and simply reprogrammed so that sensors with different sensitivities or calibrations can be integrated into the system 10, or for that matter, as requirements for the system 10 change, totally different types of sensors may be added to the system 10. Data is generated by the sensors 20 through 46 which are connected to a microcontroller/multiplex system 48 of which two, 48a and 48b, are shown in FIG. 1.

In the preferred embodiment, each microcontroller/multiplexer system 48 is constructed to accept analog inputs from a wide variety of sensors that may have different operating voltages or operational characteristics. For example, sensor 20 might be a simple switch closure sensor, sensor 22 might produce an analog voltage signal, sensor 24 might be a current loop sensor, whereas sensors 36 and 38 might be sensors that produce RS-232 or TTL serial data by communicating with the microcontroller 48a through an RS-232 or TTL serial port. Sensors 36 and 38 can be of the type that produce much more sophisticated data. Examples of such sensors which are commercially available are the ion mobility spectrometers or airborne vapor monitors (AVM) produced by the Graseby Company and multiple gas meters such as the Neotronics Model 75. In the case of the Neotronics Model 75, a separate interface (not shown) needs to be provided since it has neither an RS-232 or TTL serial data output.

The computer 12, at intervals controlled in accordance with its programming, sends signals through a host control board 50 which typically connects to the computer 12 through an RS-232 port, to interface the computer 12 with a radio transceiver system 52. The system 52 sends a coded digital signal packet which, among other things, includes a company identification byte, a system identification byte, a microcontroller/multiplexer identification byte, and one or more command bytes to signal the system 48a or 48b to perform a function such as: read the sensors 20 through 38 or 40 through 46; turn sensor 36 on or off; or accept data from sensors 36 or 38. The signal 54 transmitted by the radio transceiver system 52 is received at radio transceivers 56 and 58 which are connected to microcontroller/multiplexer systems 48a and 48b respectively. Only a system 48 programmed to accept the three exact identification bytes that are transmitted is activated to perform the desired function. If the function desired is for the system 48 to provide a data transmittal of sensor information, the computer 12 signals the radio transceiver system 52 to switch to the receive mode whereas the microcontroller/multiplexer 48 once activated to reply with the requested data, is programmed to wait a suitable time before the reply so that in the case of system 48a, the radio transceiver system 52 and the radio transceiver 56 have time to reconfigure from transmit and receive modes to receive and transmit modes respectively.

The data, thereafter, is transmitted for receipt at the computer 12 where it is decoded, displayed on the screen 16, stored in non-volatile memory 60, such as magnetic disks and/or provided in hard copy by a hard copy printer 62. In most instances the hard copy printer 62 is activated only on demand. In addition, the computer 12 can activate alarms 64 and 66. Alarm 64 is usually co-located with the host computer 12 for alerting a central operations area to an impending problem. The alarm 66 is activated by the system 48 after a signal is transmitted from the computer 12 to activate it. In this way, the programming to determine hazardous levels or trends exists in the computer 12 at a remote, presumably relatively safe, location. This is desirable so that if conditions change requiring different programming, persons do not have to physically go to the remote microcontroller/multiplexer systems 48a or 48b where a toxic contamination level might already exist.

Figure 2:
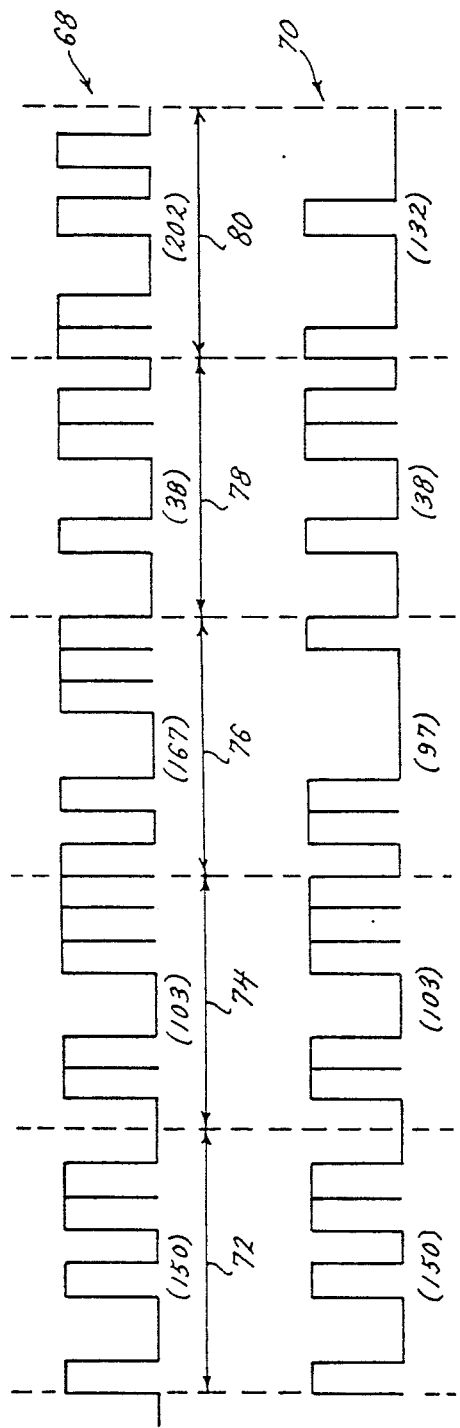
FIG. 2 is a comparison representation of a typical host to field unit data packets.

Since, even in the best radio communication systems, noise and other atmospheric disturbances can cause errors or omissions in a data stream, the data packet usually also includes a check sum number which is dependant upon the preceding bits in the message. FIG. 2 shows a side-by-side comparison of typical host data packets 68 and 70 with the most significant bit first in each byte. The first byte 72 of each packet 68 and 70 is a manufacturer identification number and the second byte 74 is a system identification number. For this example, the microcontrollers 48a and 48b have the same manufacturer's number and are in the same system 10. Thus the first and second bytes 72 and 74 of each packet 68 and 70 are identical digital numbers, one hundred fifty and one hundred three when converted to the base 10. The third byte 76 is a microcontroller identification number so bytes 76 differ to identify that in the case of data packet 68, microcontroller 48a is activated by number one hundred sixty seven, whereas in data packet 70, microcontroller 48b is being activated by number ninety seven. The fourth byte 78 is the command for the particular microcontroller being polled. Bytes 78 are shown as identical number thirty eights therefore indicating that the same command signal is being sent to both microcontrollers 48a and 48b. If different commands were being sent to the microcontrollers 48a and 48b, then these bytes would differ. In large systems 10, with many different commands, the fourth byte 78 might be multiple bytes. The fifth bytes 80 being check sum bytes on the previous four bytes 72, 74, 76, and 78 are constructed by adding the four previous bytes and disregarding all but the eight least significant digits. Adding the first four bytes of the data packet 68 results in the number four hundred fifth eight which disregarding all but the eight least significant binary digits results in number two hundred two, whereas in data packet 70 the result using the same method is one hundred thirty two. Therefore, the fifth bytes in the data packets 68 and 70 are two hundred two and one hundred thirty two.

The data packets 68 and 70 are shown with the most significant digit to the left in each byte for ease of understanding. This is not meant to reflect that a convention of least significant digit first or least significant digit last is required to practice the invention.

Figure 3:
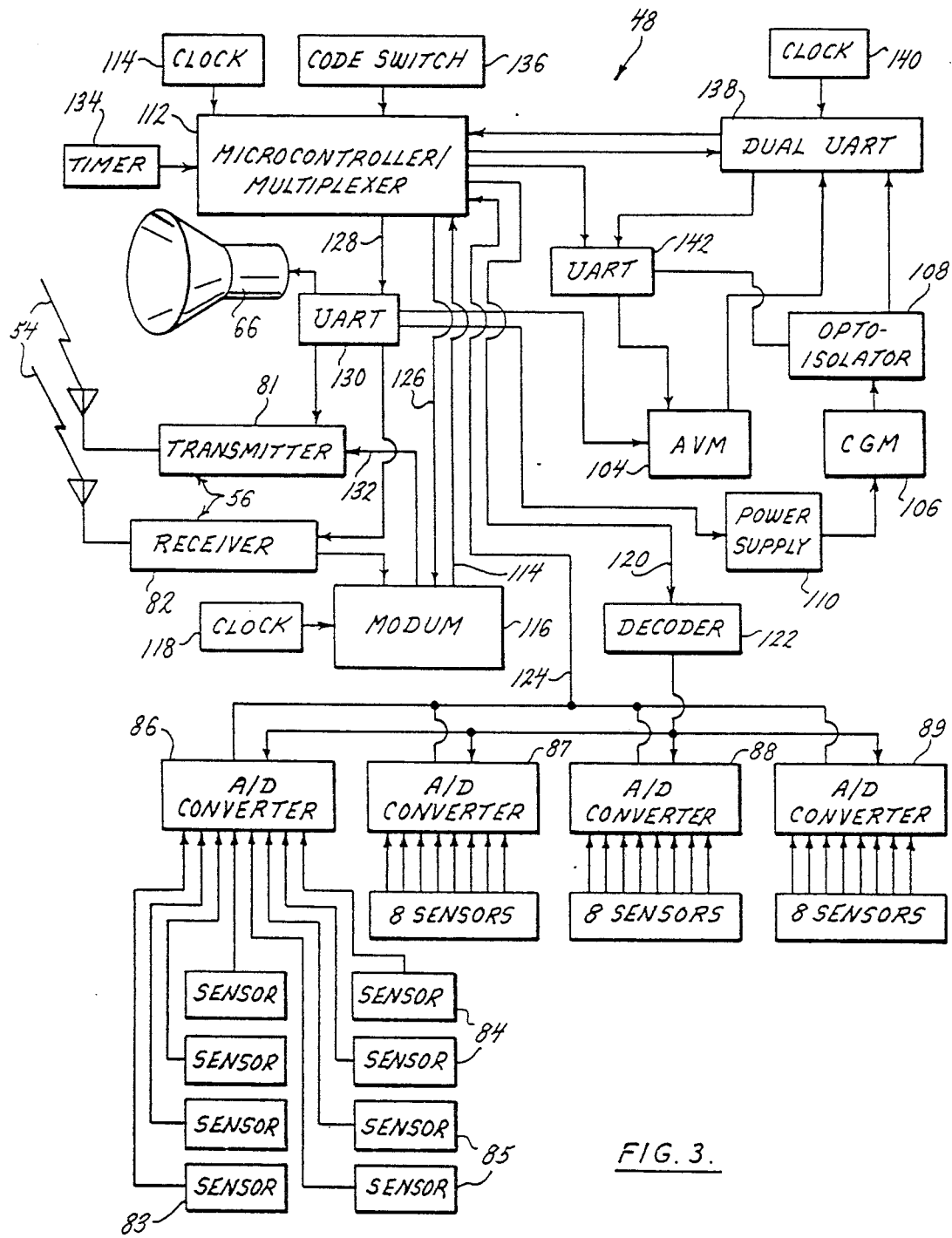
FIG. 3 is a diagram of a field unit of the present invention for the system of FIG. 1.

FIG. 3 is a more detailed diagram of the microcontroller/multiplexer system 48 along with its connected sensors. The microprocessor controlled multiplexer 48 is the component that receives multiple inputs, conditions and segregates them, and aligns and formats the data for transmission by the transmitter portion 81 of the transceiver 56 when the proper request code is received thereat via the receiver portion 82. As shown, the microprocessor controlled multiplexer 48 permits up to thirty-two separate analog signals which may be voltage, current loop, or switch closure signals produced by sensors 83, 84, and 85 respectively.

Figure 4:
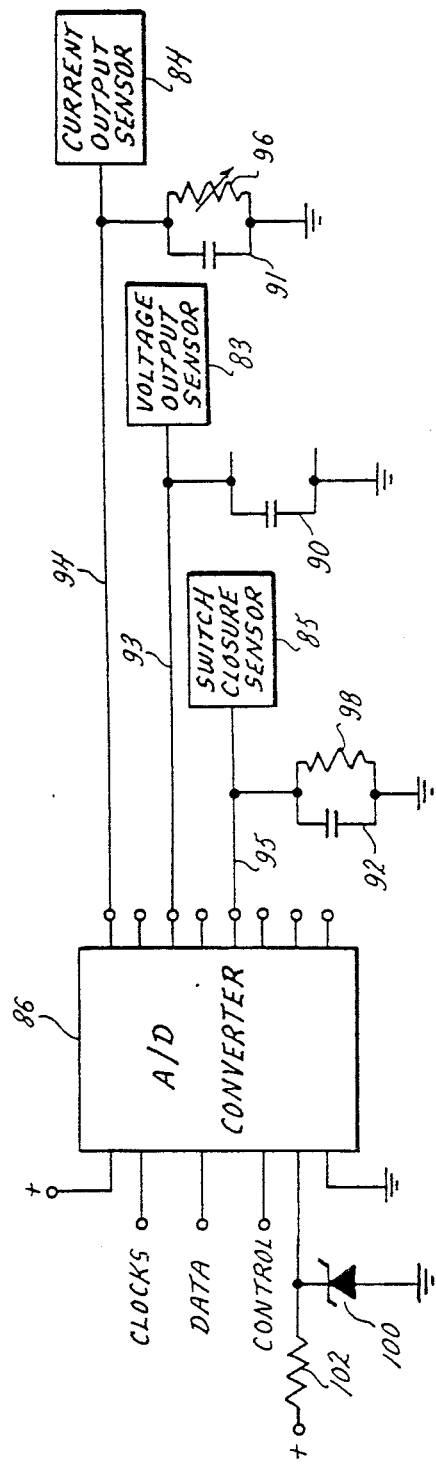
FIG. 4 is a detailed diagram of the sensor to field unit interface used in the system of FIG. 1.

As shown, the system 48 also includes four analog to digital converters 86, 87, 88 and 89 with the A to D converter 86 with three associated sensors 83, 84, and 85 being shown in FIG. 4. The versatility to allow a large variety of commercially available and/or specially constructed sensors is accomplished by placing a grounded RC network 90, 91 and 92 on each input line 93, 94 and 95. When a system 48 is connected to its sensors, the networks 90, 91 and 92 are adjusted for the particular sensor type. For example, network 90 is shown without a resistor, providing essentially a network of infinite direct current impedance because it is connected to a sensor whose output is a voltage level. The networks 90, 91, and 92 are all voltage level producers connected to high impedance inputs of the A to D converter 86 no matter which sensor is used so the network 91 includes a resistor 96, shown as adjustable, so that it can used to select the proper maximum voltage produced by the maximum current expected out of the current output sensor 84 in that channel. For the switch closure sensor 85, an RC network 92 with a fixed pull-up resistor 98 is used.

As shown, the A to D converter 86 has a separate low voltage reference made up of a grounded zenor diode 100 and a voltage pull down resistor 102 whose opposite side is connected to a voltage supply (+). This allows the A to D converter 86 to be used for applications where the input voltage ranges produced by the sensors 83, 84, and 85 and the networks 90, 91, and 92, span substantially less than the supply voltage. For applications where the input voltage ranges span the supply voltage the diode 100 is eliminated and the resistor 102 is replaced with a short (not shown).

As shown in FIG. 3, the system 48 also provides serial data interface for up to two special sensor instruments via an RS-232 or TTL interface. In the configuration, shown in FIG. 3, the interface is to an airborne vapor monitor 104 and a chromatographic gas monitor (CGM) 106. The airborne vapor monitor is shown having interfaces to provide special control for mode, alarm and for tubing loop back used when the instrument 104 is cleared before system storage. The monitor 104 also has an interface so that the power therein can be switched on and off remotely to extend battery reserve. In the case of the CGM 106, the system 48 provides for the special requirements of opto-isolation by connecting signals thereto through an opto-isolator 108 and power therethrough by a switchable power supply 110 included in the system 48, again to prolong battery life. Although the system 48 is usually connected for primary power to a power line, it is preferable to provide battery backup so that data can be transmitted even after line power fails. This assures an information flow during a catastrophe up to the time the system 48 is physically destroyed. Other special sensors which can connect through an RS-232 or TTL serial interface can also be supported by the system 48.

The "brains" of the system 48 are provided by a microcontroller 112 whose timing is provided by clock 114. It receives the data packet from the receiver 70 through a modem 116 whose timing is controlled by clock 118. The microcontroller 114, upon receipt of a data packet from the host computer 12, verifies the identification numbers and the check sum value. If all these verify, the command indicated by the command data byte is performed. If the data byte command is to read sensor data, the microcontroller 112 requests this information on line 120 through a decoder 122 to turn on the appropriate A to D converter 86, 87, 88, or 89 and clock its analog signal inputs in a specified order out through line 124 back to the microcontroller 112 in a fashion like the command data packets 68 or 70. When the return data packet is formatted within the microcontroller 112, it is sent back via line 126 to the modem 116 while at the same time a signal via line 128 is sent through UART 130 to activate the transmitter 81. Upon receipt of the data packet through the modem 116 via line 132, the transmitter 81 forwards the packet to the radio transceiver system 52 and eventually to the computer 12 where the requested data is stored and/or displayed. After each message, the microcontroller 112 is deactivated by a timer 134 for a time sufficient to assure lack of interference. Once the time has past and the microcontroller 112 is reactivated, its first operation is to read a code switch 136 which is manually set when the system 48 is originally installed. This allows the microcontroller 112 to recognize the identification bytes in the data packet from the computer 12 whereas the manufacturer and system bytes are usually provided by ROM (not shown).

If the original command packet from the computer 12 was instead a command to sound an alarm, the microcontroller 48 would output a signal via line 128 to the UART 130 to activate the alarm 66 which will remain on until an alarm off signal is received in the same manner from the computer 12. The alarm interface provides the computer 12 capabilities to forward alarm information to the system 48. This capability warns personnel remote from the computer 12 but adjacent the system 48 to undesirable environmental levels in the immediate vicinity of the system 48.

A dual UART 138 whose timing is controlled by a separate clock 140, is used to provide the serial data interface for up to two special instruments. If desired, one of the voltage level sensor lines can be used to sense low voltage at the system by adjusting its RC network so that a nonexistent sensor appears to drop out at the A to D converter 86 when the input voltage thereto goes below a preselected voltage level. When a proper request is received by the microcontroller 112, it transmits this information like a sensor was installed. The computer 12 receiving this information can produce an alarm to the operator that the battery or line power supply to the system 48 is reaching a voltage level where the remaining data can not be relied upon.

The CGM 106 is connected through the opto-isolator 108 because its output is not compatible in level to those required by most dual UART 138. The opto-isolator 108 is controlled through a UART 142 which is controlled by UART 142. In addition, the UART 142 is controlled by the microcontroller 112 and the dual UART 138 to provide various operational signals to the AVM 104 as well as receive alarms therefrom when the AVM 104 is not operating properly.

The host control board 50 and the microcontroller system 48 also include connections to their associated radio transceiver systems 52 or 56. Upon command of the computer 12, which command is programmed to happen at a predetermined interval, the host control board 50 and the microcontroller 48 test for power deviation levels in each transmitter and frequency drift in each transmitter and receiver. This is included as a diagnostic system to eliminate costly radio maintenance and to build and sustain confidence in the system communication link. This is accomplished by monitoring the responses and error rates so that there is no question to an operator whether or not the radio link is in fact working and to alarm to the operator when an excessive amount of error, such as lack of response or multiple check sum errors, is occurring.

Therefore, there has been shown and described a novel system for sensing and reporting environmental problems to a remote location which fulfills all of the objects and advantages sought therefore. Many changes, alterations, modifications and other uses and applications of the subject package concept will become apparent to those skilled in the art after considering the specification together with the accompanying drawings. All such changes, alterations and modifications which do not depart from the spirit and scope of the invention are deemed to be covered by the invention which is limited only by the claims which follow.

I claim:

1. An environmental data acquisition system including:
    a first plurality of environmental sensors which produce analog outputs representative of sensed environmental conditions; and
    a first multiplexer system having:
        first radio communication means having:
            a transmitter; and
            a receiver; and
        first multiplexer means including:
            first conversion means connected to said first plurality of environmental sensors to convert said analog outputs of said first plurality of environmental sensors to digital outputs;
            first format means to format said digital outputs into a first data packet;
            first connection means to connect said first data packet to said transmitter of said first radio communications means for transmitting thereby; and
            first verification means to accept a first command packet from said receiver of said first radio communications means and activate said first format means upon acceptance thereof to format said digital outputs into said first data packet.

2. The environmental data acquisition system of claim 1 further including:
    second radio communication means having:
        a transmitter capable of transmitting command packets; and
        a receiver capable of receiving data packets including said first data packet from said transmitter of said first radio communications means; and
    a computer having:
        command means to produce at least said first command packet connected to said transmitter of said second radio communications means for transmission of said first command packet to said receiver of said first radio communications means, said first command packet including:
            at least one byte which is unique to said at first multiplexer system;
            means to receive said first data packet from said receiver of said second radio communications means; and
        display means to display said outputs of said plurality of environmental sensors sent in said first data packet.

3. The environmental data acquisition system of claim 2 wherein said command means further include:
    means to produce a checksum byte representative of the sum of bytes in said command packet for inclusion in said command packet.

4. The environmental data acquisition system of claim 3 wherein said first verification means include:
    first identification means to identify when said at least one unique byte is present in a command packet received by said receiver of said first radio communication means; and
    first summing means to sum bytes in said command packet and compare the least significant digits thereof with checksum byte for identity, upon identification of said at least one unique byte and identicality of said checksum byte, said first verification means accepting said first command packet.

5. The environmental data acquisition system of claim 4 wherein said first identification means include:
    a code switch allowing manual setting of said at least one unique byte which is accepted.

6. The environmental data acquisition system of claim 5 further including:
    at least one complex sensor connected to said first multiplexer system having:
        an input/output interface and capable, when commanded by said first command packet, to produce a complex sensor output signal thereon, and wherein said first multiplexer means further include:
    first extraction means capable of extracting a complex sensor command signal from said first command packet when said first command packet includes one and communicating said complex sensor command signal to said complex sensor to produce a complex sensor output to said first format means for inclusion in said first data packet.

7. The environmental data acquisition system of claim 6 wherein said input/output interface includes an RS-232 port and a TTL port.

8. The environmental data acquisition system of claim 6 wherein said first multiplexer system further includes:
an alarm annunciator connected to said first multiplexer means, said first multiplexer means activating said alarm annunciator when commanded to do so by said first command packet.

9. The environmental data acquisition system of claim 8 wherein said computer further has:
means to cause said first command packet to include an alarm command on receipt of predetermined information in said first data packet.

10. The environmental data acquisition system of claim 4 further including:
a second plurality of environmental sensors which produce analog outputs representative of sensed environmental conditions; and
a second multiplexer system having:
third radio communication means having:
a transmitter; and
a receiver; and
second multiplexer means including:
second conversion means connected to said second plurality of environmental sensors to convert said analog outputs of said second plurality of environmental sensors to digital outputs;
second format means to format said digital outputs of said second conversion means into a second data packet;
second connection means to connect said second data packet to said transmitter of said third radio communications means for transmitting thereby; and
second verification means to accept a second command packet from said receiver of said third radio communications means and activate said second format means upon acceptance thereof to format said digital outputs of said second conversion means into said second data packet.

11. The environmental data acquisition system of claim 10 wherein said command means produce said second command packet to said transmitter of said second radio communications means for transmission of said second command packet to said receivers of said first and third radio communications means, said second command packet including:
at least one byte which is unique to said at second multiplexer system, said means to receive said first data packet from said receiver of said second radio communications means also receiving said second data packet for display on said display means.

12. The environmental data acquisition system of claim 11 wherein said command means further include:
means to produce a checksum byte representative of the sum of bytes in said second command packet for inclusion in said second command packet.

13. The environmental data acquisition system of claim 12 wherein said second verification means include:
second identification means to identify when said at least one unique byte is present in said second command packet received by said receiver of said third radio communication means; and
second summing means to sum bytes in said second command packet and compare the least significant digits thereof with said checksum byte for identity, upon identification of said at least one unique byte and identicality of said checksum byte, said second verification means accepting said second command packet.

14. A sensor data acquisition system including:
at least one first sensor which produces an analog output representative of sensed conditions;
at least a first complex sensor having:
an input/output inteface and capable of producing a first complex sensor output signal thereat;
a first multiplexer system having:
first radio communication means having:
a transmitter; and
a receiver; and
first multiplexer means including:
first conversion means connected to said at least one first sensor to convert said analog output of said at least one first sensor to a first digital output;
first format means to format said firs digital output and said complex sensor output signal into a first data packet on command;
first connection means to connect said first data packet to said transmitter of said first radio communications means for transmitting thereby;
first verification means to accept a first command packet from said receiver of said first radio communications means and activate said first format means upon acceptance thereof.

15. The sensor data acquisition system of claim 14 wherein said input/output interface includes an RS-232 port and a TTL port.

16. The sensor data acquisition system of claim 14 further including:
at least one second sensor which produces an analog output representative of sensed conditions;
at least a second complex sensor having:
an input/output interface and capable of producing a complex sensor output signal thereat;
a second multiplexer system having:
second radio communication means having:
a transmitter; and
a receiver; and
second multiplexer means including:
second conversion means connected to said at least one second sensor to convert said analog outputs of said second sensor to a second digital output;
second format means to format said second digital output and said second complex sensor output signal into a second data packet on command;
second connection means to connect said second data packet to said transmitter of said second radio communications means for transmitting thereby;
second verification means to accept a second command packet from said receiver of said second radio communications means and activate said second format means upon acceptance thereof.

17. The sensor data acquisition system of claim 14 further including:
third radio communication means having:
a transmitter capable of transmitting command packets; and a receiver capable of receiving data packets including said first and second data packets; and a computer having:
  command means to produce first and second command packets, said command means being connected to said transmitter of said third radio communications means for transmission of said first and second command packets to said receivers of said first and second radio communications means, said first and second command packets each including:
    at least one byte which is unique to a multiplexer system;
  means to receive said first and second data packets from said receiver of said third radio communications means; and
  display means to display said outputs of said plurality of sensors sent in said first and second data packets.

18. The sensor data acquisition system of claim 17 wherein said command means further include:
  means to produce a checksum byte representative of the sum of bytes in each command packet for inclusion in said command packet.

19. The sensor data acquisition system of claim 18 wherein said first and second verification means each include:
  identification means to identify when said at least one unique byte is present in a command packet received; and
  summing means to sum bytes in said command packet and compare the least significant digits thereof with said checksum byte for identity, and upon identification of said at least one unique byte and identicality of said checksum byte, said verification means accepting said command packet.

20. The environmental data acquisition system of claim 19 wherein said first and second multiplexer systems each further include:
  an alarm annunciator connected to said multiplexer means thereof, said multiplexer means activating said alarm annunciator when commanded to do so by said command packet, and wherein said computer further has:
  means to cause said first command packet to include an alarm command on receipt of predetermined information in said first data packet; and
  means to cause said second command packet to include an alarm command on receipt of predetermined information in said second data packet.

* * * * *